(12) United States Patent
Mefford

(10) Patent No.: US 9,930,881 B2
(45) Date of Patent: Apr. 3, 2018

(54) CORRUGATED FISH SCREEN WITH CONTINUOUS FLOW REFUGIA

(71) Applicant: Brent W. Mefford, Lakewood, CO (US)

(72) Inventor: Brent W. Mefford, Lakewood, CO (US)

( * ) Notice: Subject to any disclaimer, the term of this patent is extended or adjusted under 35 U.S.C. 154(b) by 90 days.

(21) Appl. No.: 14/851,522

(22) Filed: Sep. 11, 2015

(65) Prior Publication Data

US 2016/0076213 A1 Mar. 17, 2016

Related U.S. Application Data

(60) Provisional application No. 62/049,554, filed on Sep. 12, 2014.

(51) Int. Cl.
| | | |
|---|---|---|
| *A01K 61/10* | (2017.01) | |
| *A01M 29/30* | (2011.01) | |
| *E02B 1/00* | (2006.01) | |
| *A01K 61/00* | (2017.01) | |
| *E02B 5/08* | (2006.01) | |

(52) U.S. Cl.
CPC ............ *A01M 29/30* (2013.01); *A01K 61/00* (2013.01); *A01K 61/10* (2017.01); *E02B 1/006* (2013.01); *E02B 5/085* (2013.01)

(58) Field of Classification Search
CPC ........ A01K 61/00; A01K 61/10; A01K 61/90; A01K 61/95; A47G 2019/306
See application file for complete search history.

(56) References Cited

U.S. PATENT DOCUMENTS

| | | | | |
|---|---|---|---|---|
| 1,178,428 A | | 4/1916 | Tozier | |
| 1,671,450 A | * | 5/1928 | Ross ...................... | A21B 3/134 220/23.2 |
| 3,511,172 A | * | 5/1970 | Jones ...................... | A47J 43/18 249/120 |
| 3,716,144 A | * | 2/1973 | Bartlow ................ | B01D 29/03 210/499 |
| 3,987,585 A | * | 10/1976 | Greenbaum ........... | A01G 9/028 47/73 |
| 4,014,135 A | * | 3/1977 | Greenbaum ........... | A01G 9/028 47/85 |
| 4,107,876 A | * | 8/1978 | Greenbaum ........... | A01G 9/028 47/62 C |

(Continued)

*Primary Examiner* — Kristen C Hayes
(74) *Attorney, Agent, or Firm* — Russell T. Manning; Marsh Fischmann & Breyfogle LLP

(57) ABSTRACT

A fish screen is presented having a porous surface made of two or more corrugations (e.g., elongated convex shapes) having an at least partially porous surface. The incorporation of a porous area on the corrugations allows increasing the total porous surface area compared to an underlying diversion area. The porous area is a magnification of an underlying diversion area, which reduces the fluid pressure (e.g., impingement forces) acting on the porous area of the screen. The valley between each pair of corrugations is solid, not porous. The solid valley(s) provide two important functions; they provide multiple small solid surface flow channels over the screen surface. These solid channels protect small or weak swimming aquatic organisms from impingement on the screen. That is, once organisms reach the solid channel, they may move along the solid channel free of impingement until they reach the edge of the screen.

15 Claims, 4 Drawing Sheets

(56) References Cited

U.S. PATENT DOCUMENTS

| | | | |
|---|---|---|---|
| 4,740,105 A | | 4/1988 | Wollander |
| 5,232,609 A | * | 8/1993 | Badinier ................ A21B 3/155 |
| | | | 249/102 |
| 5,628,245 A | * | 5/1997 | Baze ...................... A47J 37/01 |
| | | | 249/120 |
| 6,524,028 B2 | | 2/2003 | Bryan |
| 6,726,404 B2 | * | 4/2004 | Nestler ................... E02B 1/006 |
| | | | 119/219 |
| 8,061,268 B1 | * | 11/2011 | McGuinness ......... A47J 36/027 |
| | | | 99/422 |
| 9,332,766 B2 | * | 5/2016 | Tingley .................. A21B 3/132 |
| 2004/0112228 A1 | * | 6/2004 | Nash, Jr. ................ A47G 19/30 |
| | | | 99/450.1 |

\* cited by examiner

CORRUGATED FISH SCREEN WITH CONTINUOUS FLOW REFUGIA

CROSS REFERENCE

This application claims the benefit of the filing date of U.S. Provisional Application No. 62/049,554 having a filing date of Sep. 12, 2014, the entire contents of which are incorporated herein by reference.

FIELD

This disclosure is directed to fish screens. More specifically the disclosure is directed to fish screens having a corrugated surfaces with refugia between some or all of the corrugations to protect young life stages of aquatic species.

BACKGROUND

Screens are often used to filter agricultural, municipal and industrial water/flow diversions. The screens prevent debris from passing into such flow diversions. In such applications, a porous surface (e.g., mesh or fabric) covers a flow diversion allowing water to filter though the porous surface while the porous surface prevents debris from entering the flow diversion. When such screens are used to prevent aquatic species from passing into the flow diversion, the screens are commonly referred to as fish screens. The porous surface of these fish screens is sized to prevent passage of aquatic species through the porous surface into the flow diversion. In addition, it is desirable to prevent entrainment/impingement of aquatic species against the porous surface of the screen. In some areas, fish screens are required by federal and state laws to protect aquatic inhabitants from entrainment and removal from native waters. Fish screens are unique from other industrial screens because they must operate within guidelines set by biological parameters such as organism swimming ability and behavior. Accordingly, it would be desirable to design a fish screen to protect aquatic species/organisms from impingement on the screen and allow such organisms to return to their native waters.

SUMMARY

The present disclosure is directed to a fish screen that has various unique features. The porous surface or fabric of the screen is shaped in a corrugated form (e.g., elongated convex shape) to increase screen area compared to a projected flat area (e.g., diversion area). This allows the porous area to be a magnification of the diversion area, which reduces the fluid pressure (e.g., impingement forces) acting on the porous area of the screen. The corrugation of the screen surface also provides for another unique attribute. The valley between each pair of corrugations is solid, not porous. This feature is important and unique for fish screens. The solid screen valleys provide two important functions; they provide multiple small solid surface flow channels over the screen surface. These solid channels protect small or weak swimming aquatic organisms from impingement on the screen. That is, once organisms reach the solid channel, they may move along the solid channel free of impingement until they reach the edge of the screen. The corrugation shapes can be triangular, trapezoidal or curved (e.g., in cross-section) and may be varied on a single screen.

Typically, the fish screen includes a frame that supports two or more elongated convex surfaces (e.g., corrugations) that extend at least a portion of the distance between first and second edges of the frame. The elongated convex surfaces have an open end the disposed downward. At least a portion of the convex surfaces are porous. In one arrangement, the porous portions of the convex surfaces are formed of a plurality of apertures extending through the convex surface. In another arrangement, the convex surfaces are formed a wire mesh. In any arrangement, the maximum cross-dimension of the pores of the porous surface are sized to prevent passage of debris and/or aquatic species through the porous surface. Disposed between the convex surfaces is a solid surface. In one arrangement, the solid surface is a recessed channel having a solid bottom and first and second lateral edges. The recessed channel may be of any appropriate shape including, for example, square trapezoidal, half circular etc. The lateral edges of the convex surface are connected to or integrally formed with lateral edges of the elongated convex surfaces. In the latter regard, the convex surfaces and recessed channel may be formed from a sheet of metal. In various arrangements, the screen may include a plurality of elongated convex surfaces with a solid surface between each adjacent pair of convex surfaces.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Fish screens are often used to cover water diversions/flow diversions to prevent entry of debris and/or aquatic species into the diversion. When placed over a diversion, the flow of the water though the fish screen can impinge debris and aquatic species against the surface of the screen. Provided herein is a fish screen that reduces the impingement forces present at the surface of the screen and provides escape routes from the interior of the screen to edges of the screen. Such escape routes may have little or no impingement forces allowing aquatic species to readily move from an interior of the screen to an edge of the screen and back to their native waters.

Figure 1:
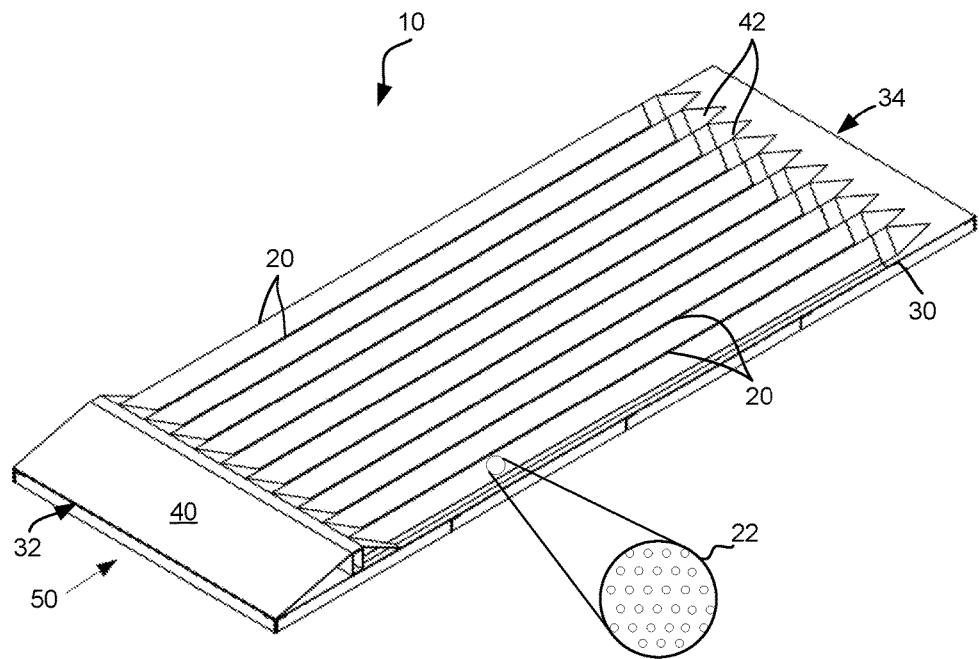
FIG. 1 is an isometric rendering of a corrugated fish screen.
Figure 2:
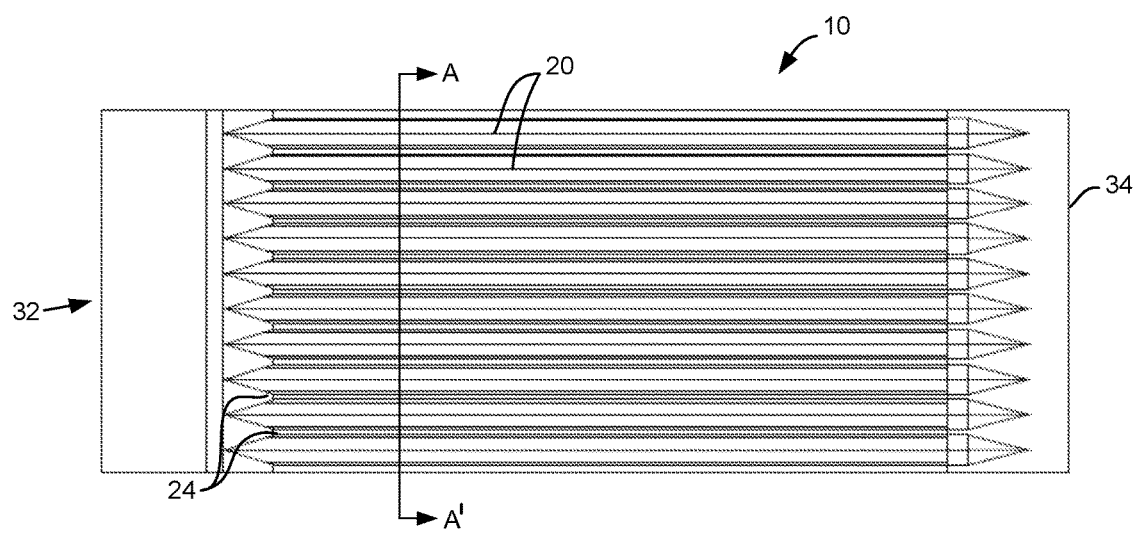
FIG. 2 is a plan view of the corrugated fish screen.

FIGS. 1 and 2 show isometric and plan views of one embodiment of a fish screen 10 in accordance with various aspects of the presented inventions. As shown, the screen 10 includes a plurality of aligned corrugations 20 that, in the illustrated embodiment extend along a majority of the length of the screen from a forward end 32 (e.g., upstream end)

toward a rearward end 34 (e.g., downstream end). The corrugations 20 are designed to be substantially aligned with a flow direction 50, when the screen 10 is in use. Further, each corrugation includes a porous surface 22 that is sized to allow water to filter through the corrugations while preventing debris and/or aquatic species from passing there through.

Figure 3:
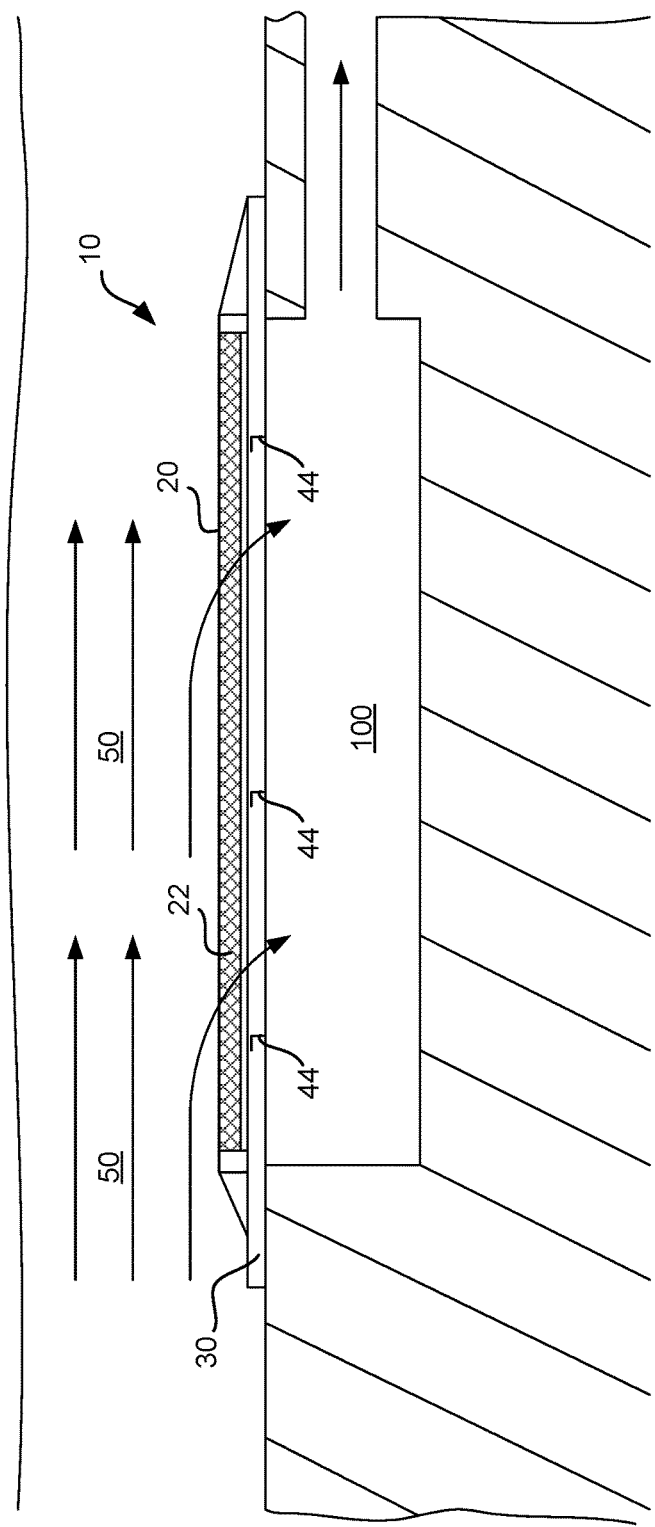
FIG. 3 is a side view of the fish screen.

FIG. 3 illustrates the fish screen 10 as applied to water diversion 100. In the illustrated embodiment, the fish screen 10 is applied over the diversion 100 at the bottom of a water flow 50. In this illustration, the fish screen 10 is utilized in a horizontal configuration on the bottom of the flow 50. However, this is not a requirement and it will be appreciated that fish screen 10 may be applied in other orientations (e.g., angled etc.). As shown, the fish screen covers the diversion 100 such that a frame 30 of the fish screen 10 is supported about a periphery of the diversion 100. When so positioned, the porous surfaces of the corrugations 20 are disposed above the diversion 100. As water flows past the screen 10, the water is able to pass into the porous surfaces 22 of the corrugations 20 and into the flow diversion 100 while preventing debris and aquatic species from entering into the diversion 100.

Figure 4:
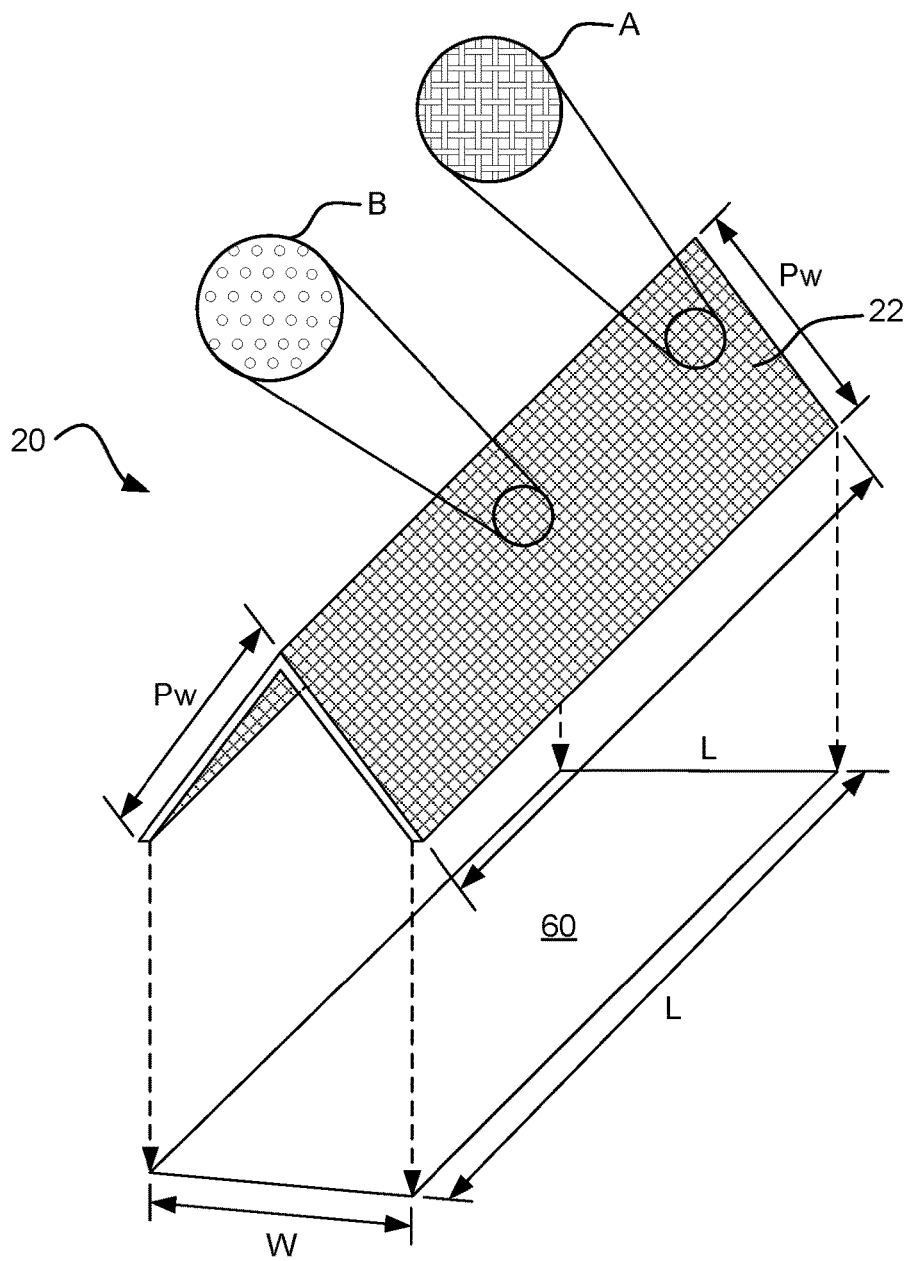
FIG. 4 illustrates an elongated porous corrugation.

FIG. 4 illustrate one embodiment of a portion of a corrugation 20 removed from the fish screen for purposes of illustration. As shown, the corrugation 20 is at least partially formed of a porous surface 22. Any porous surface may be unitized and may include, without limitation, woven wire surfaces (e.g., Detail A) and solid surfaces with a plurality of apertures/holes formed (e.g., drilled, punched) through the surface (Detail B). In any arrangement, the size of the pores (e.g., spacing between wires, aperture diameter etc.) are selected to permit water to pass through the surface while preventing aquatic species above a predetermined size from passing through.

As shown, each corrugation 20 is an elongated convex surface that, when disposed on the frame 30 raises, a reference plane of the screen 10 as generally defined by screen frame 30. See, e.g. FIG. 1. To reduce the impingement forces experienced by the porous surfaces of the screen 10, each corrugation has a total surface area that is a multiple of the projection area/diversion covered by the corrugation. That is, the convex three-dimensional surface formed by the porous areas of each corrugation is larger than the projected diversion area covered by the corrugation. Referring again to FIG. 4A, the porous surface area of the exemplary angled corrugation is larger than the diversion area 60 covered by the corrugation 20. Stated otherwise, the porous surface area of the convex corrugation is larger than the area defined by the open end of the convex corrugation. In the illustrated embodiment, the porous surface area is calculated as twice the porous width (Pw) of the corrugation times the porous length (L) of the corrugation. In contrast, the projection area 60 of the porous surface is equal to the width (W) times the porous length of the corrugation (L). That is:

$2Pw \times L > W \times L$

Though illustrated with an angled corrugation, will be appreciated that similar calculations can be made for any convex corrugation (e.g., in cross-section) including, without limitation, half-circular, trapezoidal etc. In any arrangement, the porous screen area is a magnification of the flow diversion area covered by the corrugation 20. In one embodiment, the porous screen area is at least 1.25 times the projection area. In further embodiments, the porous screen area is at least 1.5 times the projection area. In a yet further embodiment, the porous screen area is at least 2.0 times the projection area. Magnification of porous screen area compared to the diversion area covered by the corrugation allows flow passing through the smaller diversion area to pass through a larger porous area. This reduces the impingement force (e.g., fluid pressure) on the porous screen per unit area. Lower impingement forces entrap less debris and aquatic species.

Figure 5:
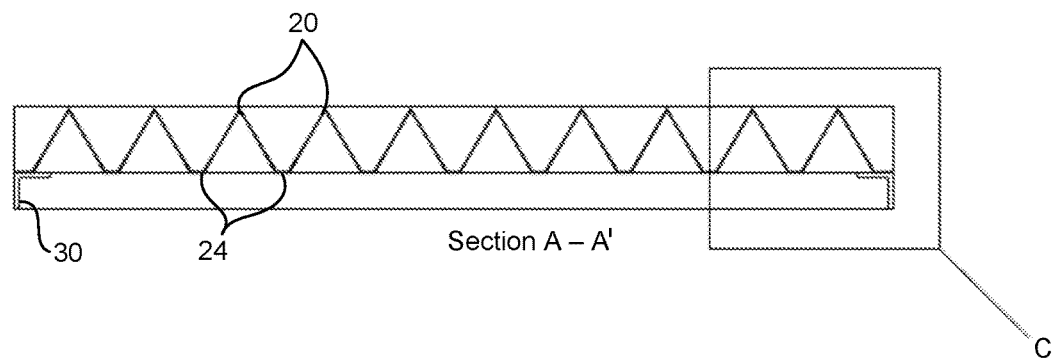
FIG. 5 is a cross-sectional view of Section A-A from FIG. 2.
Figure 6:
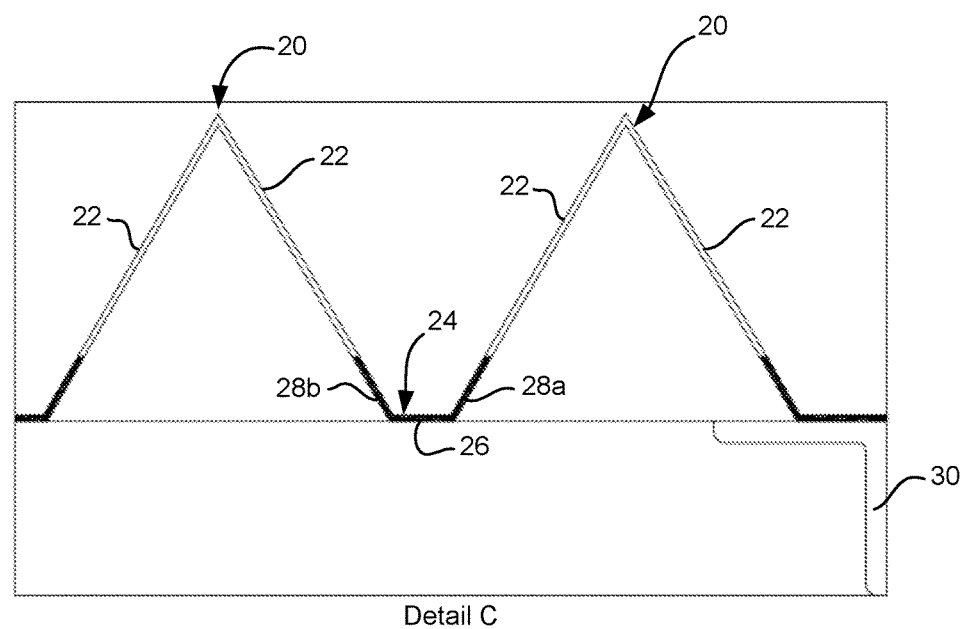
FIG. 6 is a detail from FIG. 4.

To further reduce the impingement forces experienced by debris and aquatic species contacting the screen, the valleys 24 between adjacent corrugations 20 are solid. This is best illustrated in the plan view of FIG. 2, the cross-sectional view of FIG. 5 and the detail view of FIG. 6. As shown, each solid valley 24 extends between the porous surfaces 22 of two adjacent corrugations 20. In the illustrated embodiment, the solid valley 24 is generally U-shaped or trapezoidal. That is, the solid valley 24 includes a bottom surface 26 (e.g., flat) and two upwardly extending legs 28a and 28b. Such a configuration provides a recessed channel, which further provides a refuge for aquatic species to move toward the edge of the screen. Though the solid valley is illustrated with a recessed channel, it will be appreciated that other configurations are possible. In any embodiment, the solid valley 24 provides a flow channel across the screen from the forward end 32 to the rearward end 34 with no impingement forces that may trap debris or aquatic species against the screen. Rather, when the corrugations 20 and valleys 24 are aligned with a flow direction, the resulting flow through the valleys is directed toward the edge of the screen 10, which provide an escape route for aquatic species across the screen and helps remove debris from the surface of the screen 10. In use, young life stages of aquatic species will naturally navigate to the deeper valleys where solid continuous passage is available. Diverted flow will pass through the screen in the porous surfaces 22 of each corrugation 20. See FIG. 3.

The forward end and/or rearward end of the corrugations 20 may further include optional flow guidance structures. Referring to FIG. 1, the forward ends of the corrugations abut against and angled accelerator plate 40. As shown, the accelerator plate 40 is an angled surface that extends from the forward end of the frame 30 and extends to the peak surfaces of the aligned corrugations 20. As shown, the accelerator plate covers the open forward ends of the corrugations preventing objects from entering into these open ends. When utilized, the accelerator plate 40 also diverts the flow upward as it passes over the screen 10. This reduces the fluid pressure on the forward ends of the porous corrugations 20. That is, the accelerator plate 40 diverts the flow upward as it contacts the screen 10. This allows the water to drain through the porous surfaces rather than flowing directly into the porous surfaces. Again, this further reduces the impingement force on the porous surface. The embodiment of the screen illustrated in FIG. 1 also includes a plurality of individual flow guides 42 disposed on the rearward end of the corrugations 20. These flow guides enclose the rearward open ends of the corrugations 20. In other embodiments, such flow guides may be disposed on the forward ends of the corrugations (not shown). In such an arrangement, the flow guides direct flow along the screen.

As illustrated in the side view of FIG. 3, the screen may optionally include a number of flow baffles 44 disposed behind/below the screen 10, which allow for a more equal distribution of fluid flow through the screen. That is, the flow baffles provide resistance to water passing through the screen such that the forward end does not experience significantly higher flow velocities relative to downstream portions of the screen. The number spacing and physical configuration of the baffles may be varied based on expected conditions (e.g., expected flow velocity, etc.).

The fish screen may be constructed of any appropriate materials. Typically the fish screen is form of corrosion resistant metals. In one embodiment, the corrugations their porous surfaces and the solid valleys between the corrugations are integrally formed from a common sheet of metal. In such an arrangement, the metal sheet may be perforated (e.g., drilled, punched, laser cut, etc.) to for the porous surfaces. At this time, the sheet may be shaped (e.g., bent) to form the corrugations having the solid valleys there between. However, other methods of manufacture are possible and within the scope of the presented inventions. For instances, metal screens (e.g., woven) may be shaped to form the convex corrugations and the lateral edges of the metal screens may be attached (e.g., riveted, spot welded etc.) to, for example, lateral edges of solid channels. The porous corrugations and solid channels may then be attached to a frame. Alternatively, the frame may be integrally formed with the corrugations and solid valleys. The width and length of the screen may be sized based on its intended use. That is, the screen may be manufactured to the dimensions of a particular diversion.

In summary, the fish screen can be placed in any orientation from vertical, a porous wall which flow passes through, to horizontal, a porous floor with flow passing over and down through the screen. Most typically, the screen corrugations run parallel to the major direction of flow. Water passes through the screen and fish and debris travel along the screen face returning to native water. The three-dimensional screen surface formed by corrugating the screen provides a magnification of screen area compared to a flat screen surface/diversion area of the same area. This allows more flow to be passed through the screen per unit area. A portion of the valleys formed between the corrugations are preferably a solid material such that the screen contains multiple parallel rows of porous screen and solid valley channels. Weak swimming fish and other aquatic organisms will naturally seek the screen valleys where they are protected from impingement as they pass the entire length of the screen. The solid valleys further serve a benefit by passing debris and fine sediment the length of the screen. This reduces cleaning requirements of the screen compared to a similar continuous flat surface screen.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A fish screen, comprising
a frame having a forward end, a rearward end and side edges defining on open interior and a reference plane, wherein the frame is configured for disposition about a periphery of a water diversion inlet;
at least two corrugations extending over a portion of the open interior of the frame between the forward end and the rearward end, each corrugation being an elongated convex shape having:
a peak surface disposed above the reference plane;
first and second side sloping surfaces extending from the peak surface and terminating in first and second lateral edges that define an open bottom of the corrugation, wherein the open end bottom of the corrugation faces the reference plane; and
a porous surface having a porous area that is greater than the open bottom of the corrugation defined between the first and second lateral edges multiplied by a length of the corrugation; and
a first solid surface disposed between adjacent lateral edges of the first and second corrugations, wherein the solid surface extends over at least a portion of the open interior of the frame, wherein said corrugations and said solid surface form a substantially continuous surface over the open interior of the frame such that all water passing through said open interior of the frame passes through the porous surfaces of the corrugations.

2. The screen of claim 1, having at least a third corrugations are disposed in parallel with said at least two corrugations and extending over a portion of the open interior of the frame between the forward end and the rearward end, wherein a second solid surface extend between a lateral edges the third corrugation and a lateral edged of one of the two corrugations.

3. The screen of claim 1, wherein the porous area of each corrugation is at least 1.5 times the area of the diversion area covered by the corrugation.

4. The screen of claim 1, wherein the porous area of each corrugation is at least 2 times the area of the diversion area covered by the corrugation.

5. The screen of claim 1, wherein said porous surface comprises a plurality of apertures formed though the corrugations.

6. The screen of claim 1, further comprising:
an angled plate extending between the side edges of the frame and disposed in front of forward ends of the corrugations, wherein said angled plated extends from proximate to the forward edge of the frame to the peak surface of each of the corrugations.

7. The screen of claim 1, wherein
said solid surface comprises a recessed channel.

8. The screen of claim 1, wherein said corrugations and said solid surface are integrally formed.

9. A fish screen, comprising
a frame having a forward end, a rearward end and side edges defining on open interior and a reference plane, wherein the frame is configured for support about a periphery of a water diversion inlet;
at least first and second elongated convex surfaces extending over a portion of the open interior of the frame between the forward end and the rearward end, wherein each said convex surface has a porous surface area, and, in cross-section, a peak surface extending above the reference plane and first and second sloped side surfaces extending toward the reference plane;
at least one recessed channel having a solid bottom surface and first and second lateral edges, wherein said first lateral edge is fixedly attached to an edge of one of said sloped side surfaces of said first convex surface and said second lateral edge is connected to an edge of one of said sloped side surfaces of said second convex surface, wherein said recessed channel defines a valley between porous surface areas of said first and second convex surfaces; and wherein said elongated convex surfaces and said recessed channel define a continuous surface between said side edges of said frame and wherein when disposed on the water diversion inlet, all water passing through the open interior of the frame between said side surfaces passes through said porous surface areas of said elongated convex surfaces.

10. The screen of claim 9, wherein each porous surface area is larger than an area covered by an open end said convex surface.

11. The screen of claim 10, wherein each said porous surface area is at least 1.5 times the area covered by an open end of said convex surface.

12. The screen of claim 10, wherein each said porous surface area is at least 2.0 times the area covered by an open end of said convex surface.

13. The screen of claim 9, further comprising:

at least three elongated convex surfaces disposed in parallel; and at least first and second recessed channels disposed between lateral edges of adjacent ones of said at least three elongated convex surfaces.

14. The screen of claim 9, wherein said first and second elongated convex surfaces and said recessed channel are integrally formed.

15. The screen of claim 9, further comprising:

an angled plate extending between said side edges of said frame and disposed in front of forward ends of said elongated convex surfaces, wherein said angled plated extends from proximate to said forward end of said frame to said peak surfaces of said corrugations.

* * * * *

UNITED STATES PATENT AND TRADEMARK OFFICE
CERTIFICATE OF CORRECTION

PATENT NO. : 9,930,881 B2  
APPLICATION NO. : 14/851522  
DATED : April 3, 2018  
INVENTOR(S) : Mefford Page 1 of 1

It is certified that error appears in the above-identified patent and that said Letters Patent is hereby corrected as shown below:

In the Claims

Column 6, Line 24 and 25, delete "corrugations are disposed" and insert therefore --corrugation disposed--

Signed and Sealed this
Twenty-ninth Day of May, 2018

Andrei Iancu
*Director of the United States Patent and Trademark Office*